Aug. 8, 1967 D. G. HAINES 3,334,904

PHONOGRAPH CARTRIDGE

Filed May 21, 1964 4 Sheets-Sheet 1

Inventor
Donald G. Haines

By Welsh and Bradway
Attorneys

Aug. 8, 1967 D. G. HAINES 3,334,904

PHONOGRAPH CARTRIDGE

Filed May 21, 1964 4 Sheets-Sheet 2

Inventor
Donald G. Haines

By Welsh and Bradway
Attorneys

Aug. 8, 1967 D. G. HAINES 3,334,904

PHONOGRAPH CARTRIDGE

Filed May 21, 1964 4 Sheets-Sheet 3

Inventor
Donald G. Haines
By Welsh and Bradway
Attorneys

Inventor
Donald G. Haines
By Welsh and Bradway
Attorneys 3,334,904

PHONOGRAPH CARTRIDGE

Donald G. Haines, Elmhurst, Ill., assignor, by mesne assignments, to Electro-Voice Incorporated, Buchanan, Mich., a corporation of Indiana Filed May 21, 1964, Ser. No. 369,133
19 Claims. (Cl. 274—37)

The present invention relates generally to a phonograph cartridge comprising a housing, one or more transducer elements, a stylus holder, one or more styli in the holder adapted to engage a phonograph record, and a yoke connecting the stylus holder and the elements for transmitting the motion of the styli to the elements. More particularly, the invention relates to a phonograph cartridge adapted to be mounted on a hollow tone arm by inserting a part of the housing within the free end of the arm.

A primary object of the invention is to provide a phonograph cartridge of the above character which is constructed in a novel manner in relation to the tone arm to insure that the cartridge is firmly atttached to and aligned with the free end of the arm.

Another object is to provide a novel phonograph cartridge which is of small size and low mass while possessing desirable frequency response and tracking characteristics.

A further object is to provide a stereophonic cartridge with two transducer elements and a yoke arranged in a novel manner to achieve a small size and low mass of the cartridge while retaining accurate separation of the channels of a stereophonic recording.

A more detailed object is to provide a novel arrangement of the transducer elements in a diverging relation to accommodate a replaceable stylus assembly of normal proportions and, at the same time, achieve a small size in one end portion of the cartridge housing to fit in small size tone arms.

Another object is to construct the housing in a novel manner in sections to facilitate assembly of the various parts as well as enable the cartridge easily to be adapted for different exterior shapes to identify different phonograph manufacturers.

Still another object is to provide a novel construction of the stylus holder and co-operating parts of the housing to facilitate the replacement of styli and insure proper location of styli with respect to the cartridge especially where the holder is movable to different positions to expose different styli for contact with a record.

Another object it to provide a resilient stylus support and yoke to permit the stylus to move into a recess in the cartridge housing to allow the housing to engage the record and bear an excessive load when such a load is applied.

Other objects and advantages of the invention will become apparent from the following detailed description taken in connection with the accompanying drawings, in which.

Figures 10, 10A, 11, 11A:
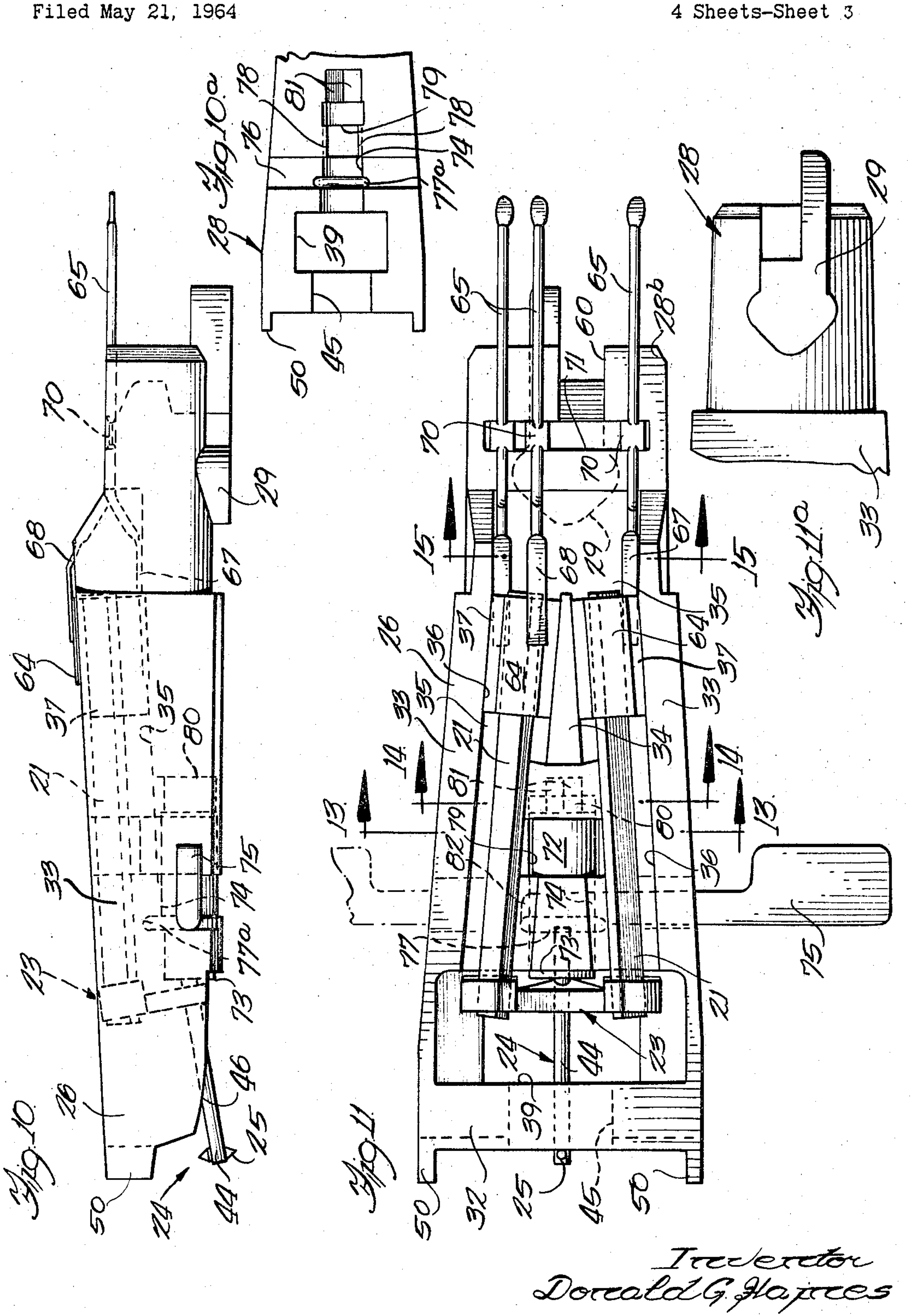
FIG. 10 is an enlarged side elevational view of the bottom section of the housing and the parts supported thereby.
Figures 12, 13, 14, 15, 16:
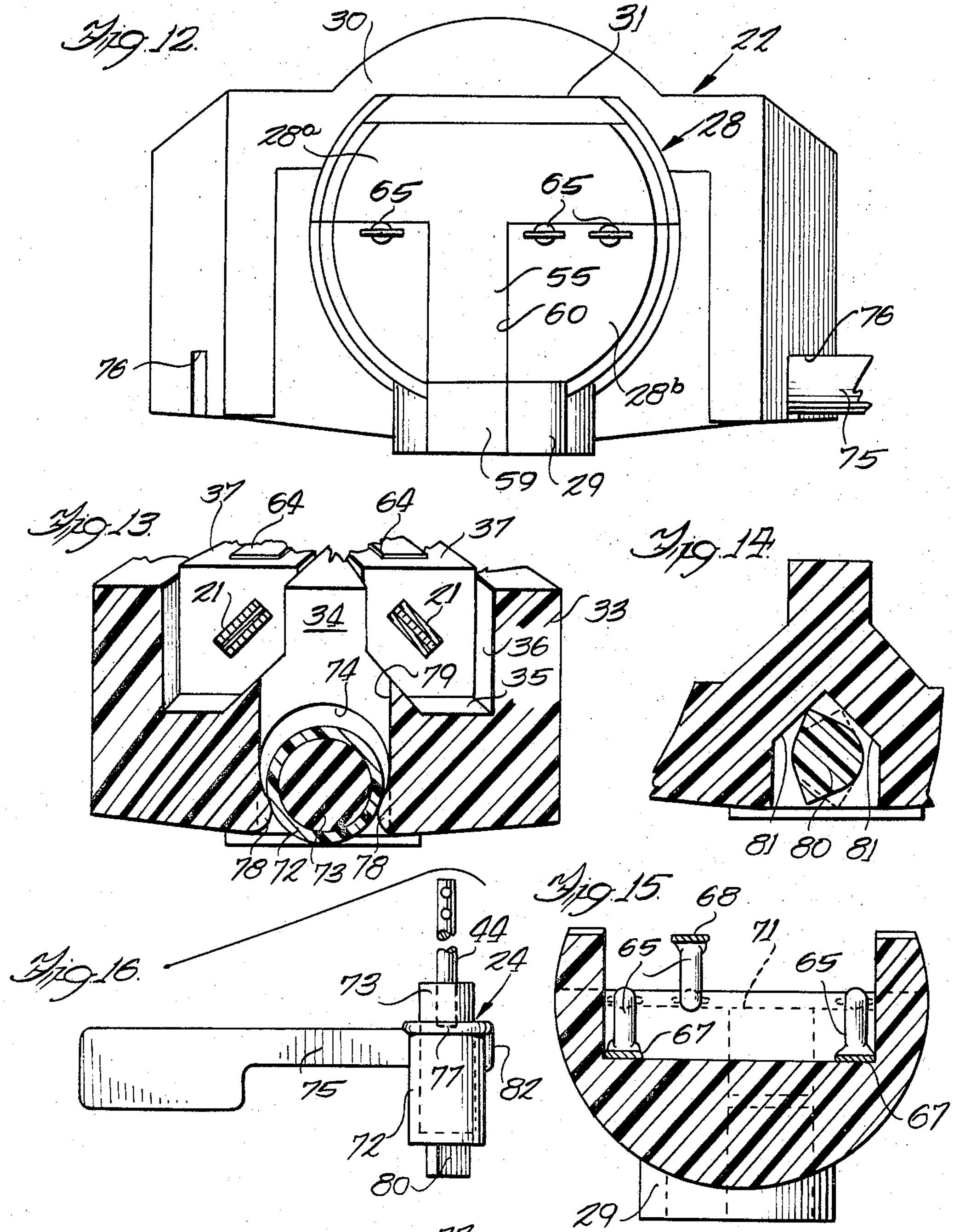

FIG. 10*a* is a fragmentary reduced bottom plan view of the bottom housing section;

FIG. 11 is a top plan view of the bottom housing section shown in FIG. 10;

FIG. 11*a* is a reduced fragmentary bottom plan view of the bottom housing section;

FIG. 12 is an enlarged rear elevational view of the cartridge;

FIG. 13 is an enlarged view taken along the line 13—13 of FIG. 11;

FIG. 14 is an enlarged fragmentary sectional view taken along the line 14—14 of FIG. 11, a different position of one part being shown in dotted outline;

FIG. 15 is an enlarged sectional view taken along the line 15—15 of FIG. 11;

FIG. 16 is a plan view of the stylus holder; and

Figure 17:
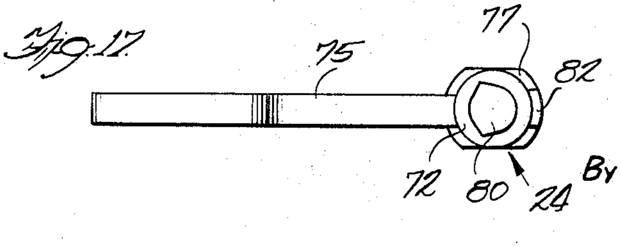

FIG. 17 is an end elevational view of the holder.

The invention as shown in the drawings for purposes of illustration is embodied in a phonograph cartridge which is especially suited for mounting in the end of a hollow phonograph pickup arm 20. The cartridge is of the stereophonic type having two transducer elements 21 mounted within a housing 22 and connected by a yoke 23 to a stylus holder 24. The latter is mounted on the housing for movement between two limit positions in which different styli 25 are brought individually into a position of downward projection beyond the cartridge for engagement with a horizontal disk record (not shown) moving beneath the pickup arm. Normally, the arm and cartridge are disposed in a generally horizontal position with the arm having a slight downward tilt of the order of a few degrees toward the record. As is well known in the art, stereophonic records are characterized by grooves having two walls arranged at 90° angles with respect to each other and undulating individually in accordance with different sounds corresponding to different channels in the stereophonic recording. Each wall faces upwardly from the record at an angle of 45° with respect to the vertical or the horizontal.

While the cartridge shown in the drawings and described in the specification and claims is disposed horizontally, it is to be understood that this orientation is only for purposes of illustration and ease of definition of the relations of the parts. It is to be understood further that there is no intention to limit the invention by such disclosure, but rather it is intended to cover all modifications and alternative constructions and uses falling within the spirit and scope of the invention as expressed in the claims.

The present invention in one of its aspects contemplates a novel construction of the housing 22 to facilitate formation of the same in plastic molding operations and to simplify assembly of all the cartridge parts as well as enable the exterior appearance of the cartridge to be changed to identify different manufacturers. To these ends, the housing is divided into an upwardly opening hollow bottom section 26 and a top section 27 which covers the bottom section. All of the cartridge parts except the top section are mounted within the bottom section as a subassembly which may be easily inserted within the top section in the final assembly. With the parts thus preassembled in the bottom section, the same bottom section may be used with top sections of different shapes and appearances. Assembly is facilitated not only by locating the transducer and yoke parts in the bottom section where they are visible and convenient to handle, but also by forming on the two sections interfitting members which move into interlocking relation to hold the parts assembled releasably as an incident to inserting the bottom section in the top section.

One end portion 28 of the housing 22, herein termed the rear end portion, telescopes within the hollow tone arm 20 and is oriented angularly therein as by an irregularly shaped key 29 projecting radially from the rear end portion (FIGS. 10 and 11) and adapted to fit into a slot of complementary shape in the tone arm. The rear end portion is of a shape generally complementary to the interior of the tone arm, herein, circular in cross section. To utilize the tone arm to assist in holding the housing sections in assembled relation, the rear end portion is made up of rearwardly projecting and longitudinally overlapping parts **28*a* and 28*b* of both the top and bottom sections 27 and 26**.

The rear end portion 28 co-operates with the tone arm 20 for firm attachment and alignment of the cartridge with respect to the arm. For these purposes, the rear end portion terminates in a rearwardly facing shoulder 30 which abuts the end of the arm and the exterior of the rear end portion is larger than the interior of the tone arm so as to spread the open end of the arm when the end portion is inserted up to the shoulder. The resulting tension in the free end of the arm provides a continuing force to hold the arm and cartridge assembled, the rear end portion preferably tapering rearwardly to compensate for the enlargement of the opening in the arm. If desired, the top of the rear end portion may be flattened at one or more places as indicated at 31 to provide keying surfaces (FIG. 12).

In the present instance, the outer or front end portion of the lower section 26 of the housing projects beyond the tone arm 20 and is of generally rectangular shape with an outer wall 32 and with two upstanding side walls 33. The top section 27, in addition to a top wall overlying the upwardly opening front end portion of the lower housing section 26, includes a downwardly extending front wall 47 which covers the front wall 32 of the bottom section. Also, the top section preferably includes two downwardly extending side walls 48 which both cover the side walls 33 of the bottom section and stiffen the top wall. While the interior of the top section is complementary to the exterior of the bottom section so as to fit telescopingly over the bottom section, the exterior of the top section may vary with different designs selected to identify different manufacturers of phonograph pickups incorporating the cartridge, the top in this instance having a projection 49 of conical shape tapering forwardly from the shoulder 30.

The interfitting members for locking the top and bottom sections 27 and 26 of the housing 22 together as an incident to assembly of the sections include at least one lug 50 projecting forwardly from the front wall 32 of the lower section to fit into a slot or recess 51 formed in the front wall 47 of the upper section. Herein there are two lugs and recesses spaced apart transversely of the housing. A tight fit of the front end portions of the top and bottom sections is insured in spite of variations in the dimensions of these parts by inclining the downwardly facing surfaces of the lugs and the co-operating upwardly facing bottom surfaces of the slots in the top section. With this arrangement, the top and bottom sections may fit together tightly with the bottom section in different positions longitudinally of the top section as indicated in phantom in FIG. 5.

Figure 4:
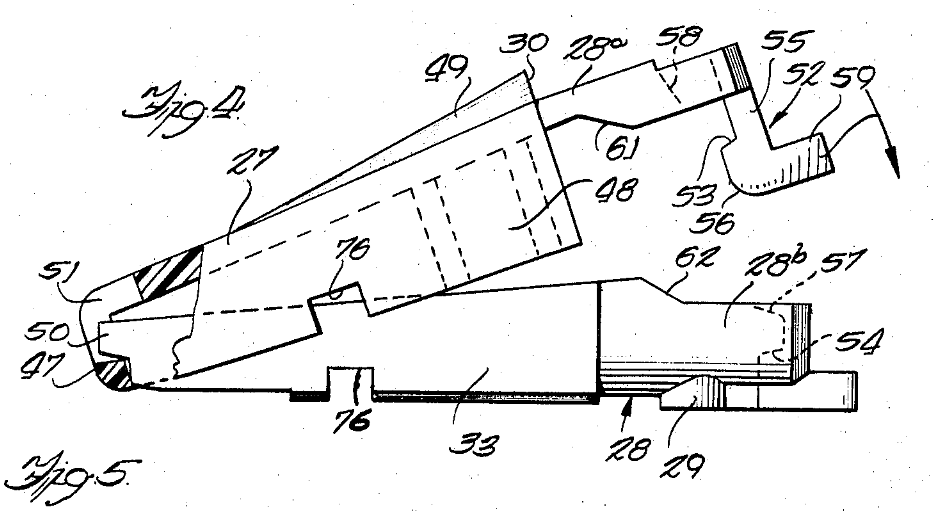
FIG. 4 is a side elevational view of the two housing sections in partially assembled relation, some parts being broken away and shown in section.
Figures 5, 6, 7, 8, 9:
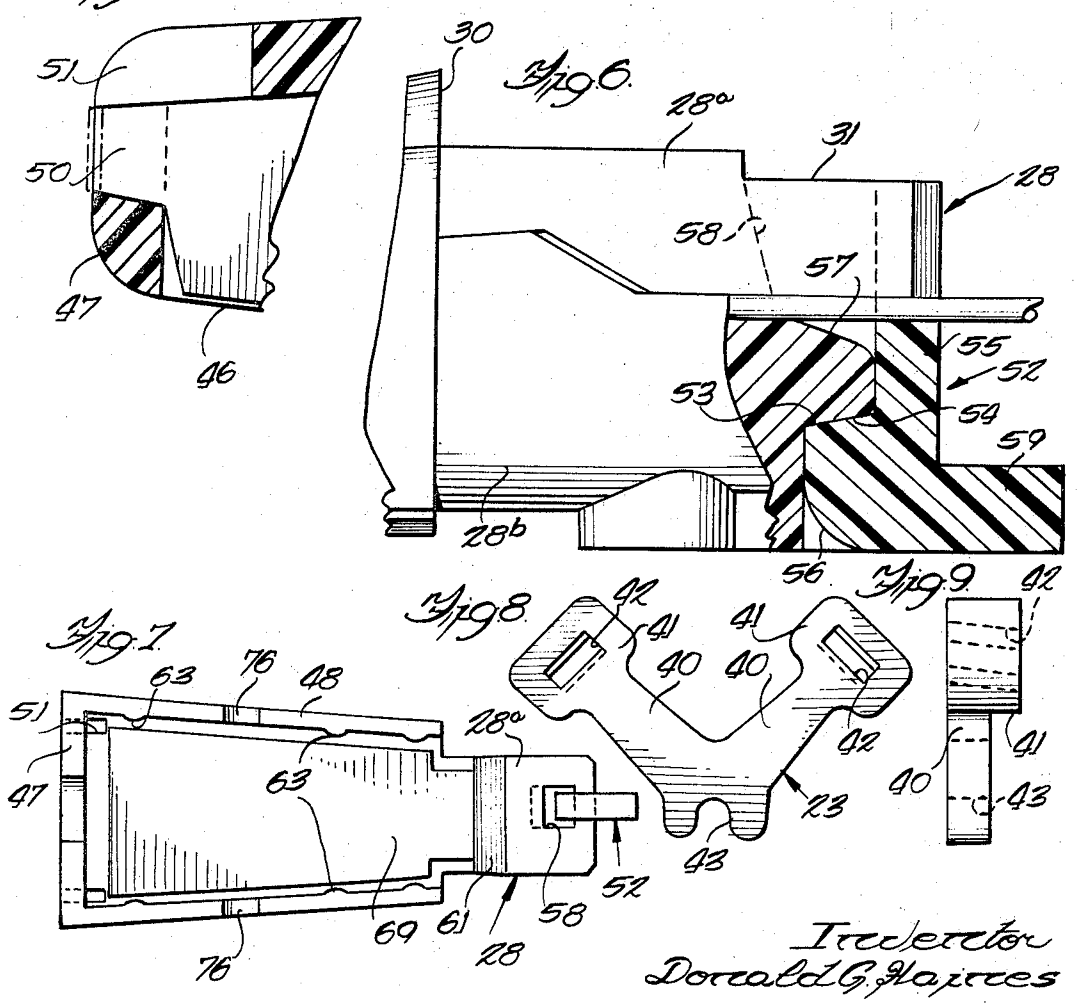
FIG. 5 is a fragmentary enlarged view similar to FIG. 4 and showing some parts at one end of the housing in their finally assembled relation.
FIG. 6 is a view similar to FIG. 5 of parts at the other end of the housing in finally assembled relation.
FIG. 7 is a reduced bottom plan view of the cover section of the housing.
FIG. 8 is a front elevational view of the yoke.
FIG. 9 is a side elevational view of the yoke looking from the right in FIG. 8.

In addition to holding the front end portions of the two housing sections 26 and 27 in finally assembled relation, the lugs 50 on the bottom section and the co-operating bottom edges of the slots 51 in the top section facilitate assembly of the parts by providing a pivotal connection enabling the rear end portions **28*a* and 28*b* of the housing sections to be moved toward each other and into interlocking finally assembled relation. To achieve the locking as an incident to such movement, a latch in the form of a hook or key 52 extends downwardly from the top section and is formed with an upwardly facing ledge or locking surface 53 adapted to engage a downwardly facing keeper surface 54 on the lower section after the hook has moved longitudinally of the upper section and behind the keeper. Such movement is permitted by flexing of the shank 55 of the hook and occurs upon engagement of a rounded downwardly facing follower surface 56 on the hook with an upwardly facing inclined cam surface 57** on the bottom section (FIGS. 4 and 6).

To facilitate movement of the hook 52 longitudinally of the housing 22 while avoiding undue stress on the shank 55, a hole 58 is formed in the rear end portion **28*a* of the upper body section 27 adjacent and on the inner side of the shank. This increases the flexibility of the connection while permitting a rigid rear end portion of the housing and also facilitates entry of a projecting male die part to form the upwardly facing latch surface. The lower end of the latch also forms a part of the key 29 on the underside of the rear end portion 28 of the housing, and for this purpose includes a rearwardly projecting lug 59. To provide a flat rear end of the housing except for the projecting key parts, the shank fits in a rearwardly opening recess 60 formed in the rear end portion 28*b*** of the bottom housing section.

To hold the housing sections in tightly assembled relation in spite of variations in the dimensions of different sections, the hook 52 exerts an endwise force on the lower section urging the section forwardly against the depending front wall of the top section. Also, the ledge 53 on the hook is inclined so that, upon its engagement with the keeper surface 54, the rear end of the lower housing section is urged upwardly into the upper section.

Within the lower housing section 26, a rib 34 extends longitudinally of the section intermediate the side walls 33 and co-operates with the side walls and a bottom wall 35 to define two recesses 36 for receiving the transducer elements 21 (FIGS. 10 and 11). Each element is of flat, elongated rectangular shape with its inner end portion fitting tightly in a rectangular hole in a mounting block 37. The two blocks 37 for the two elements 21 fit tightly within the rear end portions of the recesses 36 defined by the bottom wall 35, the side walls 33 and the center rib 34. While various types of transducer elements may be used, those shown for purposes of illustration are of the so-called "bender" or bimorph ceramic type.

Figures 2, 3:
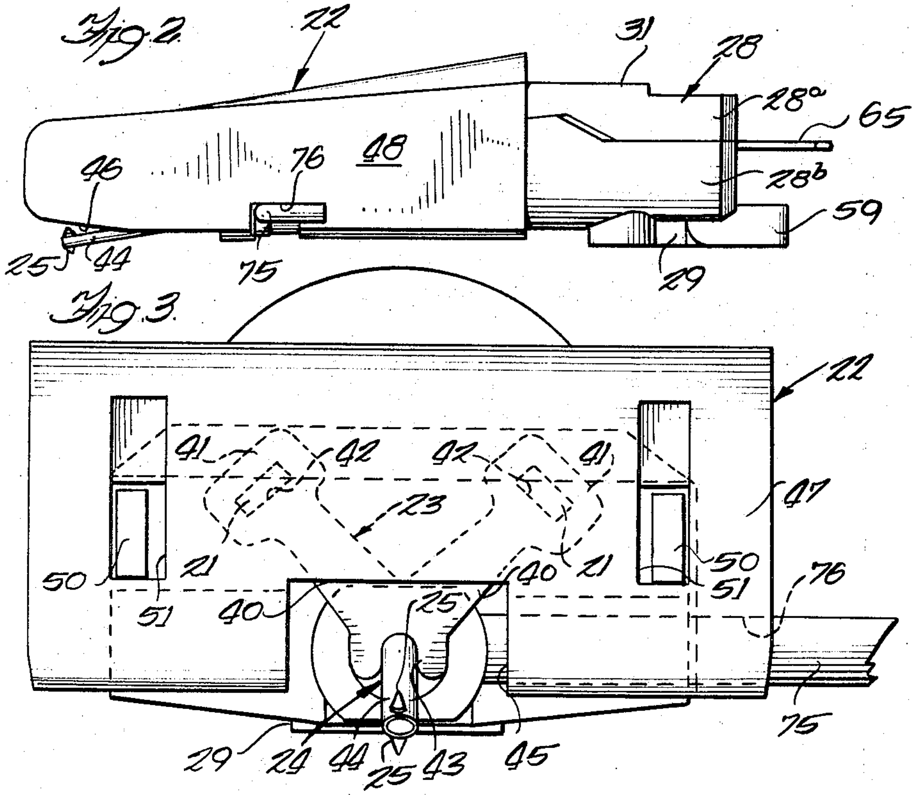
FIG. 2 is an enlarged side elevational view of the cartridge.
FIG. 3 is an enlarged front elevational view of the cartridge.

The outer or front ends of the transducer elements 21 herein project in cantilever fashion above a hole 39 extending through the bottom wall 35 of the housing section. This hole receives the yoke 23 which is of Y shape with two upper arms 40 terminating in enlarged end portions 41. Holes 42 extending through these portions receive the free end portions of the elements. A downwardly extending center arm of the Y is recessed as indicated at 43 to receive a bar 44 which is a part of the stylus holder 24 and which extends longitudinally of the housing section on the underside of the section, the styli 25 being secured in and projecting from opposite sides of the front or outer end portion of the bar beyond the yoke. Herein, the bar extends through aligned recesses 45 opening downwardly from the lower front edges of the two housing sections 26 and 27 with one stylus extending below a beveled lower front edge of the housing as indicated at 46 (FIG. 2) to engage a horizontal record (not shown).

To enable the cartridge to be used with small size, low mass tone arms having small width dimensions, especially tubular arms with cylindrical or square openings to receive the cartridge, the invention contemplates a novel arrangement of the transducer elements 21 and the yoke 23. The elements thus converge rearwardly from the yoke to the rear end portion **28*b* of the lower housing section 26. The elongated recesses 36 of the section have a similar convergence to receive the elements thereby permitting the side walls of the housing to converge rearwardly to a width closely approximating the outer diameter of the exterior of the tone arm 20** so as to merge substantially with the arm.

With each of the rectangular bender type of transducer elements 21, it is desirable that the motion of a stylus normal to the wall of the record groove corresponding to the channel associated with that element be transmitted to the element in a plane including the center line or axis of the element and disposed normal to the larger flat side of the element. This desirable relation of each element with the associated groove wall is achieved along with the rearward convergence of the elements by disposing each of the holes 42 in the enlarged end portions 41 of the upper yoke arms 40 at an angle with respect to its arm as shown in FIG. 9.

The particular angular relationship of the axis of each hole 42 with its yoke arm 40 depends on the relation of the stylus bar 44 and the transducer elements 21 and is selected to locate the plane of the yoke arms approximately normal to the bar and thereby enable the yoke and bar to have a simple abutting engagement to facilitate replacement of the stylus holder 24 while avoiding any tendency of the yoke to slide along the bar.

As is well known in the art, connections to the respective elements 21 are made through shims or strips 64 of conducting material such as foil lying against opposite sides of the elements and held in such positions as by the supporting blocks 37. Each strip has one end portion lying against one side of the element within the associated supporting block and its other end portion extending outwardly and lying against the outer side of the supporting block. In this instance, the strips from the low side of each element extend along the undersides of the blocks and lie in the bottoms of the recesses 36 in the lower housing section 26. The strips from the other sides of the elements lie along the upper sides of the respective blocks.

Figure 1:
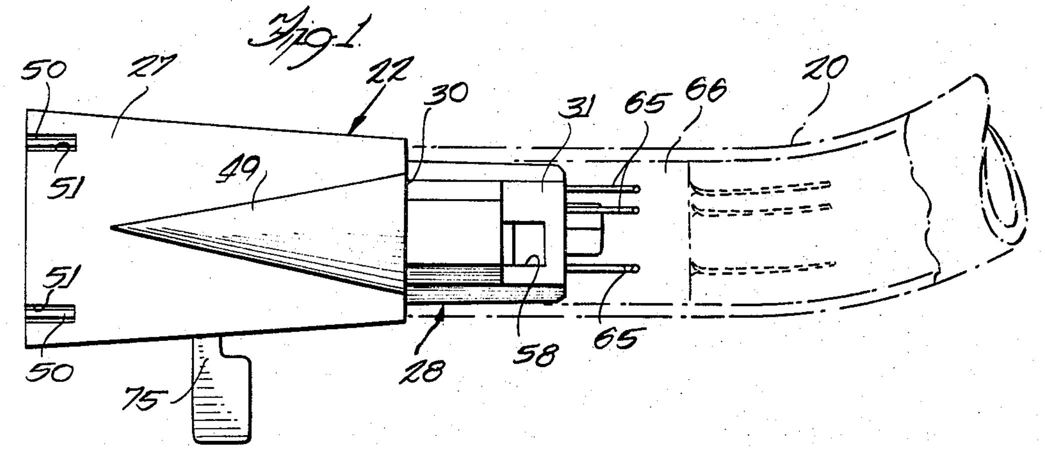
FIG. 1 is a plan view of a cartridge embodying the novel features of the present invention and the manner of mounting the same in a hollow tone arm.

External connections to the conducting strips 64 are made herein through the provisions of elongated terminal pins 65 which, at their inner end portions are connected electrically to the respective strips and, at their outer end portions, project rearwardly beyond the housing 22 for insertion into recesses in a terminal socket 66 secured within the tone arm 20 (FIG. 1). In this instance, there are three such terminal pins arranged in parallel with each other and spaced apart transversely across the inner end portion 28 of the housing between the overlapping parts **28*a* and 28*b* which form such portion. Recesses complementary in shape to the pins are formed in the rear end portion 28*b*** of the lower section to receive the respective pins.

The outer two terminal pins 65 are connected respectively to the conducting strips 64 on the undersides of the supporting blocks 37 and the inner end portions of the outer pins and bent down as indicated at 67 in FIGS. 10, 11 and 15 to lie in the bottoms of the recesses 36 for the elements 21. The center pin forms a ground connection which is connected to the conducting strips on the upper sides of the supporting blocks 37, the inner end portion of the center pin being bent upwardly as indicated at 68 to lie against the top of one of the supporting blocks. To complete the connection between the center pin and the conducting strip on the top of the other supporting block, a conductor 69 is positioned on the underside of the top wall of the upper housing section 27 (FIG. 7) to connect the center pin with the conducting strips on the tops of the supporting blocks automatically as an incident to the final assembly movement of the top section onto the bottom section 26. To hold the pins against endwise movement within their recesses and relative to the housing, sections 70 of the pins intermediate their ends are flattened and widened as by swaging to fit tightly into a transversely extending recess 71 in the rear end part **28*b* of the bottom housing section (FIG. 11). Also, the outer ends of the pins are flattened to facilitate their entry into the socket 66**.

In addition to connecting the center terminal pin 65 and the upper conducting strips 64, the conductor 69, being connected to ground through the pin, also is utilized to provide an electrostatic shield to reduce pick-up of so-called "hand capacity" or other interference or noise voltages. For this purpose, the conductor provides a large grounded conducting area on the underside of the top of the housing. While such an area may be obtained in various ways as by covering the underside of the top with a separate conducting material such as a conductive paint contacting the center pin, in this instance it is obtained by forming the conductor as a metallic pad secured by suitable adhesive to the underside of the top wall of the housing and extending over substantially the entire area of that wall. If desired, the thickness of this pad contacting the tops of the supporting blocks 37 may be varied along with the use of pads of varying thickness (not shown) beneath the blocks to adjust the vertical positions of the elements and thus the extent of protrusion of the styli beneath the cartridge.

The stylus holder 24 comprises generally the bar 44 which is secured to and supports the styli 25 at one end, a hollow cylindrical supporting body 72, and a resilient member 73 supporting the other end portion of the bar within the body. The body is mounted in a bearing recess 74 on the underside of the lower housing section 26 for rotation of the holder about the axis of the body. Such rotation is effected by a handle 75 which, to shorten the length of the holder, projects radially and outwardly from the body adjacent its forward end. The handle is manipulated by the user of the cartridge to turn the holder to one or the other of two limit positions in which the respective styli project downwardly for engagement with a record traveling beneath the cartridge. The limit positions are determined by stop surfaces 76 formed on the underside of the housing on opposite sides of the bearing recess and facing downwardly for engagement by the holder arm. Herein, the stop surfaces are the bottoms of recesses formed in the bottom wall 35 of the lower housing section 26 and adjacent edges of the side walls 48 of the top section 27. With the cartridge projecting outwardly from the tone arm, these recesses are visible as guides to facilitate replacement of the holder.

The various parts of the stylus holder 24 and related portions of the lower section 26 of the housing 22 are constructed in a novel manner to facilitate assembly of the holder in the housing and replacement of the holder as well as provide a positive snap action movement of the holder into and out of its respective limit positions. For these purposes, the body 72 of the holder is of hollow cylindrical shape with radially flexible walls and the resilient member 73 is a cylindrical plug filling the interior of the body and surrounding the inner end portion of the stylus bar to support the bar in cantilever fashion on the body. The resilient plug thus provides compliance for the bar while, at the same time, resiliently urging the body walls outwardly. The bearing recess 74 on the underside of the housing is of semi-cylindrical shape opening downwardly to receive the cylindrical exterior of the holder body. To locate the holder longitudinally of the lower housing section, a flange 77 projecting radially and outwardly from the front end portion of the holder body fits into a semi-circular recess of complementary shape located at the front end of the bearing recess, the stop surfaces projecting radially and outwardly from these recesses and the holder arm 75 extending radially and outwardly from the end portion of the body adjacent the flange. By thus securing the arm to the body, the overall length of the holder parts other than the bar 44 may be made short enough to fit between the transducer elements 21 and still permit rearward convergence of the elements.

The resilience of the cylindrical wall of the holder body 72 and the plug 73 filling the body is utilized to hold the body in the bearing recess 74. This is accomplished by the provision of two lugs 78 projecting from the lower housing section and partially across the bearing recess. The spacing of these lugs (FIG. 13) is less than the diameter of the exterior of the cylindrical body so that, as the body is pushed into the recess, opposite portions of the body wall are engaged and pushed inwardly by the lugs, these wall portions springing outwardly to fill the bearing recess after the thickest part of the body has passed inwardly beyond the lugs. Formation of these lugs as integral parts of the lower housing section in a single plastic molding operation is facilitated by forming a hole 79 extending through the bottom wall 35 of the housing section intermediate the ends of the bearing recess at a point spaced rearwardly from the hole for the yoke.

Co-operating with the bearing surface 74, the lugs 78, and the resilient holder body 72 to achieve a toggle or snap action in movement of the holder into and out of its respective limit positions are novel cam elements 80 and 81 formed on the housing 22 and the inner end portion of the holder body. One element 81 on the housing is in the form of downwardly facing flat surfaces which converge upwardly to a point to form an inverted V (FIG. 14). These are located adjacent but rearwardly of the rear end of the bearing surface 74. The other element 80 is a rearward axial projection on the rear end of the holder body. This element is of generally cylindrical contour with two radial projections of V shape forming eccentrics. In one limit position of the holder, the point of one eccentric engages one of the flat cam surfaces at a point spaced from its juncture with the other flat surfaces as shown in section in FIG. 14. In the other limit position of the holder, the point of the other eccentric (shown in phantom in FIG. 14) engages the other flat surface at a point spaced from the juncture with the first flat surface. During the movement of the holder from one limit position to the other, the respective eccentric points move through and just past dead center positions in each of which the cylindrical portion of the body is spaced further away from the bearing surface than it is in either limit position. When in either limit position the active eccentric point is just past its dead center position, the body continuously being urged toward the bearing surface due to the resilience of the cylindrical body wall and its engagement with the locking lugs 78.

To accentuate the overcenter action of the eccentrics of the cam 80 and the co-operating flat surfaces 81, a radial lug 82 projects outwardly from the cylindrical exterior of the body 72 on the side of the body opposite the handle 75. This lug engages the adjacent portion of the bearing surface 74 to shift the cylindrical body away from the surface during movement of the handle between the two limit positions. In each limit position, the lug is out of engagement with the bearing surface and projects into the recess of the adjacent stop surface 76 which is opposite the stop surface then being engaged by the handle.

The yoke 23 is formed of a compliant material such as rubber or vinyl which yields slightly under the weight of the cartridge and tone arm 20 when one of the styli 25 is engaging a record. Under this condition, the motions of the junction of the stylus bar 44 and the yoke are transmitted to the respective elements in planes normal to the larger flat sides of the elements and including their center lines, each yoke arm then being a direct acting compression member. The yieldable yoke in combination with the resilient plug 73 supporting the stylus bar 44 affords protection for the styli by permitting the styli and bar to retract into the recess 45 until the beveled lower front end engages the record or turntable to sustain any excessive weight and avoid damage to the active stylus as occurs, for example, when the tone arm is dropped. The retraction of the styli and bar is further assisted by the yieldable character of the mounting blocks 37 supporting the transducer elements 21. During the yielding of the parts and retraction of the bar, the forward end of the plug 73 may form a spacer or stop to limit any tendency of the yoke to slide rearwardly along the bar.

In the assembly of the parts of the improved cartridge, first, subassemblies of the two elements 21 with their individual supporting blocks 37 and connection strips 64 are completed. Then, after the outer two terminal pins 65 have been inserted in their recesses in the lower housing section 26 and the front end portions of the elements have been inserted into the appropriate holes 42 in the yoke 23, the blocks are inserted into the housing recesses 36 with the yoke extending through the hole 39 in the lower housing section. During this insertion, the conducting strips on the undersides of the rear blocks are brought into engagement with the front ends of the outer terminal pins. Then, the center terminal pin is inserted in its recess with its front end portion engaging the top of the adjacent supporting block and the upper housing section 27 is telescoped over the lower section with the front lugs 50 on the latter fitting into the holes 51 on the upper section as shown in FIG. 4. The undersides of the lugs engage the upwardly facing surfaces at the bottoms of the holes to form a pivotal connection for swinging of the rear end portion **28*a* of the upper housing section toward and onto the rear end portion 28*b* of the lower section. During this movement, the follower surface 56 on the latch hook 52 engages the cam surface 57 on the lower body section to shift the hook rearwardly to permit the upwardly facing locking surface 53 thereon to move downwardly and past the downwardly facing keeper surface 54 on the lower section, such shifting of the hook being facilitated without damage to the shank 55 by virtue of the hole 58 in the rear end portion 28*a*** of the upper housing section.

When the hook surface 53 has shifted beneath the cooperating keeper surface 54 on the lower housing section, the hook 52 swings inwardly into interlocking relation with the latter surface as shown in FIG. 6. The hook, due to its resilience, asserts a continuous endwise force on the housing sections to keep them in assembled relation, the inclined surface 53 on the hook and the inclined surfaces of the lugs 50 acting to shift the housing sections together vertically to obtain a tight fit in spite of dimensional variations.

After the housing sections and enclosed parts are assembled and after the subassembly of the stylus holder 24 with the stylus bar 44 and resilient plug 73 is completed, the assembly of the cartridge is completed by inserting the cylindrical bearing body 72 of the holder into the bearing recess 74 with the flange 77 fitting into its recessed portion **77*a*. As an incident to this movement, the sides of the cylindrical body portion are flexed inwardly between the locking lugs 78 and, after they move beyond the lugs, tend to return to their original shape while providing a yieldable force urging the body into the bearing recess. Also, the overcenter cam 80 is brought into engagement with the co-operating flat inverted V surfaces 81. Since the recesses adjacent the stop surfaces 76 for the arms extend through the sides of the side walls 48** so as to be visible, it is easy to orient the holder with respect to the bottom of the housing to facilitate insertion of the holder body into the bearing recess.

With the stylus holder 24, assembled in the bearing recess 74, the holder arm 75 may be moved to either of the limit positions to locate one or the other of the styli 25 in its downwardly projecting operating position. In each limit position, the arm engages one of the stop surfaces 76 and the lug 82 on the opposite side of the body extends into the opposite recess adjacent the other stop surface. Also, one of the eccentric points of the cam 80 engages a co-operating flat surface 81 in a pastcenter position as shown in full in FIG. 14 and cooperates with the resilient body 72 to provide a force urging the arm toward its limit position.

When the arm 75 is moved from one limit position to the other, the eccentric point of the cam projection 80 then engaging its flat surface 81 is moved through and past the deadcenter position and the radial lug 82 on the housing body moves into engagement with the surface of the bearing recess 74 so that the body is shifted farther out of engagement with that surface. As the arm moves through a center position between the two limit positions, the first eccentric point moves out of engagement with its flat co-operating surface and the other point moves into contact with its surface. Further movement of the arm into the other limit position is accompanied by movement of the second eccentric point along its flat surface and just past the deadcenter position to its overcenter position as shown in phantom in FIG. 14. In this position, the locking lugs 78, the cam projection 80 with its flat surface 81, and the resilient cylindrical body 72 co-operate to provide a force yieldably urging the arm into the limit position. Also, the radial lug 82 moves out of engagement with the bearing surface and into the recess opposite the arm.

Replacement of the stylus holder 24 when the styli 25 become worn is effected simply by pulling the stylus holder body 72 out of the bearing recess 74 and past the locking lugs 78 as permitted by compression of the sides of the body. During the engagement of the stylus with a record traveling beneath the cartridge, undulations of the walls of the record groove are transmitted to the respective transducer elements 21 along the yoke arms 40 which act in compression. By virtue of the novel construction of the stylus holder 24 and yoke 23 and the rearward convergence of the elements, the cartridge may be of small size so that it not only may be mounted in a hollow tone arm of small size to form an extension of the arm, but also, is suitable for mounting on a bracket within a tone arm of larger size (not shown).

I claim:

1. In a phonograph cartridge adapted to be mounted on the free end of a hollow tone arm, the combination of an elongated housing having a hollow upwardly opening bottom section and a hollow downwardly opening top section telescoping over and interfitting tightly with the bottom section, a pair of upwardly facing surfaces formed on said top section adjacent one end portion of the section and spaced downwardly from the top of the top section and transversely of the longitudinal axis of said housing, a pair of lugs rigid with and projecting outwardly from one end portion of said bottom section and providing a pair of downwardly facing surfaces engaging said top section surfaces and cooperating therewith to retain said end portions in assembled relation while permitting relative pivoting of the two sections to bring their other end portions toward each other and into assembled relation, the surfaces of at least one of said pairs being inclined with respect to said longitudinal axis to permit the surfaces to interfit in different relative positions of the sections longitudinally of the axis and thereby compensate for dimensional differences of the sections, a hook projecting downwardly from said other end portion of said top section and having an upwardly facing ledge, a latch surface formed on said other end portion of said bottom section and facing downwardly to interfit with said ledge and hold the sections in assembled relation after shifting of the ledge longitudinally of the housing and beneath the latch surface during relative pivoting of the sections about said pairs of surfaces, at least one of said surfaces of the latch and ledge being inclined with respect to said longitudinally axis to interfit tightly in different relative longitudinal positions of the sections and compensate for dimensional differences, and means on said top of said top section adjacent said hook defining a hole to facilitate molding of the section and shifting of the ledge longitudinally of the housing while permitting the top to be relatively rigid, said other end portions of said sections overlapping longitudinally of said housing and being dimensioned exteriorly to telescope within said tone arm.

2. In a phonograph cartridge adapted to be mounted on the end of a hollow tone arm, the combination of an elongated housing having an upwardly opening bottom section and a top section closing the bottom section, a first end portion of said housing being of reduced cross section to fit within said end of said tone arm and said bottom section having an upwardly opening recess on its upper side, a downwardly opening recess on its underside, and a hole connecting the two recesses adjacent the other end portion of the housing, at least one transducer element mounted within said upwardly opening recess on said upper side of said bottom section, a stylus holder supported in said downwardly opening recess on the underside of said bottom section, a yoke extending through said hole and connecting said stylus holder and said element to transmit to the latter the motion of a stylus in the holder, and said housing having two mating interlocking parts located at one location on said housing sections and two other mating interlocking parts located at another location on said housing, said two mating interlocking parts being on the bottom section and top section respectively at both locations and interfitting with each other to permit assembly of the top section to the bottom by moving the two together after assembly of the other parts within the bottom section.

3. In a phonograph cartridge adapted to be mounted on the end of a hollow tone arm, the combination of an elongated housing having an upwardly opening bottom section and a top section closing the bottom section, one end portion of said housing being of reduced cross section to fit telescopingly within said end of said tone arm, at least one transducer element mounted within said bottom section, a stylus holder supported on the underside of said bottom section, a yoke connecting said stylus holder and said element to transmit to the latter the motion of a stylus in the holder, and said housing having two mating interlocking parts located at one location on said housing sections and two other mating interlocking parts located at another location on said housing, the two mating interlocking parts being disposed on the bottom section and top section respectively at both locations and interfitting with each other to permit assembly of the top section to the bottom by moving the two together after assembly of the other parts within the bottom section.

4. In a phonograph cartridge, the combination of an elongated housing having a hollow upwardly opening bottom section and a top section covering the bottom section, at least one upwardly facing surface formed on said top section adjacent one end portion of the section and spaced downwardly from the top of the top section, at least one lug rigid with and projecting outwardly from one end portion of said bottom section and providing a downwardly facing surface engaging said top section surface and cooperating therewith to retain said end portions in assembled relation while permitting relative pivoting of the two sections to bring their other end portions toward each other and into assembled relation, at least one of said surfaces being inclined with respect to said longitudinal axis to permit the surfaces to interfit in different relative positions of the sections longitudinally of the axis and thereby compensate for dimensional differences of the sections, a hook projecting vertically from said other end portion of one of said sections and having a vertically facing ledge and a latch formed on said other end portion of the other of said sections and facing vertically in the opposite direction to interfit with said ledge and hold the sections in assembled relation after shifting of the ledge longitudinally of the housing and onto the latch during relative pivoting of the sections about said pairs of surfaces, at least one said latch and said ledge being inclined with respect to said longitudinal axis to interfit tightly in different relative longitudinal positions of the sections and compensate for dimensional differences.

5. In a phonograph cartridge, the combination of an elongated housing having a hollow upwardly opening bottom section and a top section covering the bottom section, at least one upwardly facing surface formed on said top section adjacent one end portion of the section and spaced downwardly from the top of the top section, at least one lug rigid with and projecting outwardly from one end portion of said bottom section and providing a downwardly facing surface engaging said top section surface and cooperating therewith to retain said end portions in assembled relation while permitting relative pivoting of the two sections to bring their other end portions toward each other and into assembled relation, a hook projecting downwardly from said other end portion of one of said sections and having a vertically facing ledge, a latch formed on said other end portion of the other of said sections and facing vertically in the opposite direction to interfit with said ledge and hold the sections in assembled relation after shifting of the ledge longitudinally of the housing and onto the latch during relative pivoting of the sections about said pairs of surfaces, and means on said top of said top section adjacent said hook defining a hole to facilitate molding of the section and shifting of the ledge longitudinally of the housing while permitting the top to be relatively rigid.

6. In a phonograph cartridge, the combination of an elongated housing having a hollow upwardly opening bottom section and top section covering the bottom section, a pair of upwardly facing surfaces formed on said top section adjacent one end portion of the section and spaced downwardly from the top of the top section and transversely of the longitudinal axis of said housing, a pair of lugs rigid with and projecting outwardly from one end portion of said bottom section and providing a pair of downwardly facing surfaces engaging said top section surfaces and cooperating therewith to retain said end portions in assembled relation while permitting relative pivoting of the two sections to bring their other end portions toward each other and into assembled relation, a hook secured to and projecting vertically from said other end portion of one of said sections and having a ledge facing vertically in one direction, and a latch formed on said other end portion of the other of said sections and facing vertically in the opposite direction to interfit with said ledge and hold the sections in assembled relation after shifting of the ledge longitudinally of the housing and onto the latch during relative pivoting of the sections about said pairs of surfaces.

7. In a phonograph cartridge, the combination of an elongated housing having a hollow upwardly opening bottom section and a top section covering the bottom section, at least one upwardly facing surface formed on said top section adjacent one end portion of the section and spaced downwardly from the top of the top section, at least one lug projecting outwardly from one end portion of said bottom section and providing a downwardly facing surface engaging said top section surface and cooperating therewith to retain said end portions in assembled relation while permitting relative pivoting of the two sections to bring their other end portions toward each other and into assembled relation, a hook secured to and projecting vertically from said other end portion of one of said sections and having a ledge facing vertically in one direction, and a latch formed on said other end portion of the other of said sections and facing vertically in the opposite direction to interfit with said ledge and hold the sections in assembled relation after shifting of the ledge longitudinally of the housing and onto the latch during relative pivoting of the sections about said surfaces.

8. In a phonograph cartridge, the combination of an elongated housing having an upwardly opening bottom section and a top section closing the bottom section, at least one transducer element mounted within said bottom section, a stylus holder supported on the underside of said bottom section, a yoke connecting said stylus holder and said element to transmit to the latter the motion of a stylus in the holder, and said housing having two interlocking parts disposed in one location on said housing sections and two other interlocking parts disposed in a second location on said housing sections spaced from the first location, said interlocking parts being disposed on the bottom section and top section respectively in both locations and interfitting with each other to permit assembly of the top section on the bottom section by moving the two together after assembly of the other parts within the bottom section.

9. In a phonograph cartridge, the combination of an elongated housing having a longitudinal axis and adapted to be supported in a horizontal position, a bearing surface of cylindrical contour formed on the underside of said housing and defining a downwardly opening bearing recess of cylindrical contour having its axis extending longitudinally of said housing axis, an elongated stylus holder having a hollow center bearing portion with a flexible cylindrical wall adapted to fit releasably in said recess while being rotatable about the recess axis, a handle projecting radially from one side of said bearing portion and swingable therewith between two limit positions, downwardly facing surfaces on said housing extending radially from said bearing surface to define stops engaging said handle to define said limit positions, downwardly facing cam surfaces formed on the underside of said housing at a point spaced along the housing axis from said bearing recess, a cam element projecting axially from one end of said bearing portion of said holder and having two eccentric projections alternately engageable with said cam surfaces to urge said handle to the respective limit positions, two locking lugs formed on the underside of said housing between said bearing recess and said cam surfaces and engaging the underside of said bearing portion to urge the same upwardly to retain the portion in said recess and said cam element against one of said cam surfaces, a body of resilient material secured within the other end portion of said cylindrical bearing portion, an elongated stylus support having one end embedded in said resilient body and extending outwardly from the end of said bearing portion opposite said cam element, and an overcenter lug projecting radially and outwardly from said bearing portion on the side opposite said handle and engaging said bearing surface during swinging of the handle between said limit positions, said overcenter lug, bearing surface, cam projections and cam surfaces cooperating with said bearing portion and said locking lugs to urge said holder releasably into each of said limit positions while permitting movement of the holder overcenter to the other limit position.

10. In a phonograph cartridge, the combination of an elongated housing having a longitudinal axis and adapted to be supported in a horizontal position, a bearing surface of cylindrical contour formed on the underside of said housing and defining a downwardly opening bearing recess of cylindrical contour having its axis extending longitudinally of said housing axis, an elongated stylus holder having a hollow center bearing portion with a flexible cylindrical wall adapted to fit releasably in said recess while being rotatable about the recess axis, a handle projecting radially from one side of said bearing portion and swingable therewith between two limit positions, downwardly facing surfaces on said housing extending radially from said bearing surface to define stops engaging said handle to define said limit positions, downwardly facing cam surfaces formed on the underside of said housing at a point spaced along the housing axis from said bearing recess, a cam element projecting axially from one end of said bearing portion of said holder and having two eccentric projections alternately engageable with said cam surfaces to urge said handle toward and maintain the same in the respective limit positions, two locking lugs formed on the underside of said housing between said bearing recess and said cam surfaces and engaging the underside of said bearing portion to urge the same upwardly to retain the portion in said recess and said cam element against one of said cam surfaces, a body of resilient material secured within the other end portion of said cylindrical bearing portion, and an elongated stylus support having one end embedded in said resilient body and extending outwardly from the end of said bearing portion opposite said cam element, said bearing surface, cam projections and cam surfaces cooperating with said bearing portion of said holder and said locking lugs to urge said holder releasably into each of said limit positions while permitting movement of the holder overcenter to the other limit position.

11. In a phonograph cartridge, the combination of an elongated housing having a longitudinal axis and adapted to be supported in a horizontal position, a bearing surface of cylindrical contour formed on the underside of said housing and defining a downwardly opening bearing recess having its axis extending longitudinally of said housing axis, an elongated stylus holder having a body portion with a radially flexible cylindrical wall adapted to fit releasably in said recess while being rotatable about the recess axis, a handle projecting radially from one side of said body portion and swingable therewith between two limit positions, downwardly facing surfaces on said housing extending radially from said bearing surface to define stops engaging said handle to define said limit positions, downwardly facing cam surfaces formed on the underside of said housing at a point spaced along the housing axis from said bearing surface, a cam element projecting axially from one end of said body portion of said holder and having two eccentric projections alternately engageable with said cam surfaces to urge said handle to the respective limit positions, and two locking lugs formed on the underside of said housing between said bearing recess and said cam surfaces and engaging the underside of said body portion to urge the same upwardly to retain the portion in said recess and said cam element against one of said cam surfaces, said bearing surface, cam projections and cam surfaces cooperating with said body portion and said locking lugs to urge said holder releasably into each of said limit positions while permitting movement of the holder overcenter to the other limit position.

12. In a phonograph cartridge, the combination of an elongated housing having a longitudinal axis and adapted to be supported in a horizontal position, a bearing surface of cylindrical contour formed on the underside of said housing and defining a downwardly opening bearing recess having its axis extending longitudinally of said housing axis, an elongated stylus holder having a body portion with a radially flexible cylindrical wall adapted to fit releasably in said recess while being rotatable about the recess axis, a handle projecting radially from one side of said body portion and swingable therewith between two limit positions, downwardly facing surfaces on said housing extending radially from said bearing surface to define stops engaging said handle to define said limit positions, downwardly facing cam surfaces formed on the underside of said housing adjacent said body portion, a cam element projecting axially from one end of said body portion of said holder and having two eccentric projections alternately engageable with said cam surfaces to urge said handle to the respective limit positions, and two locking lugs formed on the underside of said housing and engaging the underside of said body portion to urge the same upwardly to retain the portion in said recess and said cam element against one of said cam surfaces, said bearing surface, cam projections and cam surfaces cooperating with said body portion and said locking lugs to urge said holder releasably into each of said limit positions while permitting movement of the holder overcenter to the other limit position.

13. In a phonograph cartridge, the combination of an elongated housing having an upwardly opening bottom section and a top section covering the bottom section, a pair of transducer elements extending longitudinally of and spaced transversely of said bottom section, two resilient mounting blocks mounted within said bottom section adjacent one end thereof and having holes receiving said elements to mount the elements in the bottom section, two strips of conducting material one for each of said elements and each having one end portion contacting the associated element and the other end portion lying against the upper side of the one of said mounting blocks associated with the element, an elongated terminal pin having one end portion lying against said upper side of one of said elements and its other end portion extending exteriorly of said cartridge, interlocking parts on said housing sections interfitting with each other to hold the sections in assembled relation, and a pad of conducting material secured to the under side of said top section and engaging said one end portion of said pin and said other end portions of said strips to connect the pin and the strips automatically as an incident to assembly of the top and bottom sections together.

14. In a phonograph cartridge adapted to be mounted on the free end of a hollow tone arm, the combination of a hollow elongated housing having a longitudinal axis and front and rear end portions with the rear end portion providing an exterior of a shape complementary to the interior of said tone arm to telescope closely within the tone arm, said housing tapering rearwardly toward said rear end portion, a pair of elongated transducer elements spaced apart transversely of and extending longitudinally of said housing within the housing interior, a yoke connected to said elements adjacent said front end portion of said housing and adapted to be connected to a stylus holder to transmit to the elements the motion of a stylus in the holder, said transducer elements converging rearwardly to permit said housing to be tapered while still providing desired transducer characteristics in response to motions transmitted by said holder, and a rearwardly facing shoulder on said housing at the front end of said rear end portion to engage said tone arm and limit entry of the end portion into the arm, said rear end portion of said housing having an exterior dimension slightly larger than the interior of said arm to fit tightly within and expand the arm and tapering rearwardly from said shoulder to facilitate entry into the arm and complement the expanded interior shape of the arm.

15. In a phonograph cartridge adapted to be mounted on the free end of a hollow tone arm, the combination of a hollow elongated housing having a longitudinal axis and front and rear end portions with the rear end portion of reduced cross section to telescope closely within said tone arm, said housing tapering rearwardly toward said rear end portion, a pair of elongated transducer elements spaced apart transversely of and extending longitudinally of said housing within the housing interior and converging rearwardly to correspond to said taper of said housing, said elements having longitudinal axes lying in a common plane, a stylus holder including an elongated member extending longitudinally of said housing and canted out of parallelism with said plane of said elements, a yoke connecting said member and said elements adjacent said front end of said housing to transmit to the elements the motion of a stylus on the member and having a Y-shape with a downwardly extending portion engaging the member and upwardly diverging arms formed with holes tightly receiving the adjacent end portions of the elements, each of said holes in said yoke arms having an axis inclined away from the normal to the plane of the arms to locate the arms in a plane substantially normal to the member.

16. In a phonograph cartridge adapted to be mounted on the free end of a hollow tone arm, the combination of a hollow elongated housing having a longitudinal axis and front and rear end portions with the rear end portion of reduced cross section to telescope closely within said tone arm, said housing tapering rearwardly toward said rear end portion, a pair of elongated transducer elements spaced apart transversely of and extending longitudinally of said housing within the housing interior, and a yoke connected to said elements adjacent said front end portion of said housing and adapted to be connected to a stylus holder to transmit to the elements the motion of a stylus in the holder, said transducer elements converging rearwardly to permit said housing to be tapered.

17. In a phonograph cartridge, the combination of an elongated housing having an upwardly opening bottom section and a top section covering the bottom section, a transducer element extending longitudinally of said bottom section, a resilient mounting block mounted within said bottom section adjacent one end thereof and having a hole receiving said element to mount the element in the bottom section, a strip of conducting material having one end portion contacting said element and the other end portion lying against the upper side of said mounting block, an elongated terminal pin having one end portion lying against said upper side of said block and its other end portion extending exteriorly of said cartridge, interlocking parts on said housing sections interfitting with each other to hold the sections in assembled relation, and a layer of conducting material covering a substantial portion of the area on the underside of said top section above said element and engaging said one end portion of said pin and said other end portion of said strip to provide an electrostatic shield for said element when the pin is at ground potential.

18. In a phonograph cartridge, the combination of an elongated housing having an upwardly opening bottom section and a top section covering the bottom section, a transducer element extending longitudinally of said bottom section, a resilient mounting block mounted within said bottom section adjacent one end thereof and a hole receiving said element to mount the element in the bottom section, one of said housing sections having a recess extending transversely of the section, an elongated terminal pin having one end portion lying against said block and connected to said element and its other end portion extending exteriorly of said cartridge, an intermediate portion of said pin extending across and into said recess and having a widened section of slightly greater dimension than the width of the recess so as to fit in the recess with a tight press fit, and interlocking parts on said housing sections interfitting with each other to hold the sections in assembled relation.

19. For use in a phonograph cartridge having an elongated housing with a longitudinal axis adapted to be supported in a horizontal position, a bearing surface of cylindrical contour formed on the underside of said housing and defining a downwardly opening bearing recess of cylindrical contour having its axis extending longitudinally of said housing axis, downwardly facing surfaces on said housing extending radially from said bearing surface to define stops, downwardly facing cam surfaces formed on the underside of said housing at a point spaced along the housing axis from said bearing recess, and two locking lugs formed on the underside of said housing between said bearing recess and said cam surfaces, an elongated stylus holder having, in combination, a hollow center bearing portion with a flexible cylindrical wall adapted to fit releasably in said recess while being rotatable about the recess axis, said bearing portion being engageable with said lugs for retaining the bearing portion in said recess, a handle projecting radially from one side of said bearing portion and swingable therewith between two limit positions in which the arm engages said stops one at a time, a cam element projecting axially from one end of said bearing portion of said holder and having two eccentric projections alternately engageable with said cam surfaces to urge said handle to the respective limit positions, a body of resilient material secured within the other end portion of said cylindrical bearing portion, and an elongated stylus support having one end embedded in said resilient body and extending outwardly from the end of said bearing portion opposite said cam element, said bearing portion of said holder and same cam projections cooperating with said bearing surface, said cam surfaces and said locking lugs to urge said holder releasably into each of said limit positions while permitting movement of the holder overcenter to the other limit position.

References Cited

UNITED STATES PATENTS

| | | | |
|---|---|---|---|
| 3,105,691 | 10/1963 | Dragt | 274—37 X |
| 3,174,755 | 3/1965 | Taraborelli | 274—23 |
| 3,182,136 | 5/1965 | Dieter | 274—37 X |
| 3,183,311 | 5/1965 | McAlvay | 274—37 X |
| 3,215,440 | 11/1965 | Wood | 274—37 X |

NORTON ANSHER, *Primary Examiner.*

CLIFFORD B. PRICE, *Examiner.*